US011528461B2

(12) United States Patent
Kwak et al.

(10) Patent No.: US 11,528,461 B2
(45) Date of Patent: Dec. 13, 2022

(54) METHOD AND APPARATUS FOR GENERATING VIRTUAL VIEWPOINT IMAGE

(71) Applicant: Electronics and Telecommunications Research Institute, Daejeon (KR)

(72) Inventors: Sangwoon Kwak, Daejeon (KR); Joungil Yun, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 311 days.

(21) Appl. No.: 16/670,057

(22) Filed: Oct. 31, 2019

(65) Prior Publication Data
US 2020/0162714 A1 May 21, 2020

(30) Foreign Application Priority Data

Nov. 16, 2018 (KR) .................. 10-2018-0142009
Sep. 30, 2019 (KR) .................. 10-2019-0121007

(51) Int. Cl.
*H04N 13/111* (2018.01)
*G06T 5/00* (2006.01)
(Continued)

(52) U.S. Cl.
CPC .......... *H04N 13/111* (2018.05); *G06T 3/0093* (2013.01); *G06T 5/005* (2013.01); *G06T 7/50* (2017.01); *G06T 15/205* (2013.01)

(58) Field of Classification Search
CPC ............... H04N 13/111; H04N 13/117; H04N 2013/0081; G06T 15/205; G06T 7/11; G06T 3/0093; G06T 5/005; G06T 7/50
See application file for complete search history.

(56) References Cited

U.S. PATENT DOCUMENTS 9,652,819 B2   5/2017 Kim et al.
9,807,340 B2  10/2017 Hwang et al.
(Continued)

FOREIGN PATENT DOCUMENTS

KR  10-2011-0063778 A  6/2011
KR  10-2012-0059955 A  6/2012
KR  10-2014-0102999 A  8/2014

OTHER PUBLICATIONS

Chaurasia, Gaurav, et al. "Depth synthesis and local warps for plausible image-based navigation." ACM Transactions on Graphics (TOG) 32.3 (2013): 1-12. (Year: 2013).*
(Continued)

*Primary Examiner* — Geoffrey E Summers
(74) *Attorney, Agent, or Firm* — NSIP Law

(57) ABSTRACT

A method and an apparatus for generating a virtual viewpoint image by obtaining at least one input viewpoint image and warping pixels of the at least one input viewpoint image to a virtual viewpoint image coordinate system; mapping a patch to a first pixel of a plurality of pixels warped to the virtual viewpoint image coordinate system when a difference between a first depth value of the first pixel and a second depth value of a second pixel adjacent to the first pixel is less than or equal to a predetermined threshold and mapping no patch to the first pixel when the difference is greater than the predetermined threshold; and generating the virtual viewpoint image by blending the plurality of pixels and/or the patch are provided.

10 Claims, 27 Drawing Sheets

(51) Int. Cl.
　　　*G06T 7/50*　　　(2017.01)
　　　*G06T 3/00*　　　(2006.01)
　　　*G06T 15/20*　　(2011.01)

(56) References Cited

U.S. PATENT DOCUMENTS

2011/0148858 A1　　6/2011　Ni et al.
2011/0157229 A1*　6/2011　Ni .................. H04N 13/128
　　　　　　　　　　　　　　　　　　　　　　　　345/646

OTHER PUBLICATIONS

Buehler, Chris, et al. "Unstructured lumigraph rendering." Proceedings of the 28th annual conference on Computer graphics and interactive techniques. 2001. (Year: 2001).*

Tezuka, Tomoyuki, et al. "View synthesis using superpixel based inpainting capable of occlusion handling and hole filling." 2015 Picture Coding Symposium (PCS). IEEE, 2015. (Year: 2015).*

Achanta, Radhakrishna, et al. "SLIC superpixels compared to state-of-the-art superpixel methods." IEEE transactions on pattern analysis and machine intelligence 34.11 (2012): 2274-2282. (Year: 2012).*

Ceulemans, Beerend, et al. "Robust multiview synthesis for wide-baseline camera arrays." IEEE Transactions on Multimedia 20.9 (2018): 2235-2248. (Year: 2018).*

Pulli, Kari, et al. "View-based rendering: Visualizing real objects from scanned range and color data." Eurographics Workshop on Rendering Techniques. Springer, Vienna, 1997. (Year: 1997).*

Kwak et al., "A Study on the 3-Dimesional Warping Technique for Virtual View Synthesis of Light Field Images", *Korea Telecommunications Society Winter Conference*, 2019, pp. 104-105 (2 pages in Korean, 1 page in English).

Tehrani, Mehrdad Panahpour, et al. "Free-viewpoint image synthesis using superpixel segmentation." APSIPA Transactions on Signal and Information Processing 6., Jun. 13, 2017, (12 pages in English).

* cited by examiner

METHOD AND APPARATUS FOR GENERATING VIRTUAL VIEWPOINT IMAGE

CROSS-REFERENCE TO RELATED APPLICATION

This application claims priority to and the benefit of Korean Patent Application Nos. 10-2018-0142009 and 10-2019-0121007 filed in the Korean Intellectual Property Office on Nov. 16, 2018 and Sep. 30, 2019, respectively, the entire contents of which are incorporated herein by reference.

BACKGROUND OF THE INVENTION

(a) Field of the Invention

The present disclosure relates to a method and an apparatus for generating a virtual viewpoint image.

(b) Description of the Related Art

A technique of generating a virtual viewpoint image can be used to generate a viewpoint image at a virtual location based on an image acquired at a real viewpoint. Referring to FIG. 1, a viewpoint image at an intermediate position between a viewpoint 1 and a viewpoint 2 may be generated using the images acquired at the viewpoint 1 and the viewpoint 2. In addition, when images acquired at more viewpoints are used, a viewpoint image at an arbitrary position may be generated.

As a method for directly synthesizing the virtual viewpoint image from the acquired images, there are a method using 3D warping and a method using a disparity. Referring to FIG. 2, in the method using 3D warping, a 3D coordinate of each point in the acquired images is calculated from depth information of the acquired images, and the calculated 3D coordinate is converted into an image coordinate on a virtual viewpoint location. Referring to FIG. 3, in the method using the disparity, pixels at an input viewpoint may be directly moved through a disparity map.

SUMMARY OF THE INVENTION

An exemplary embodiment provides a method of generating a virtual viewpoint image.

Another exemplary embodiment provides an apparatus of generating a virtual viewpoint image.

According to the exemplary embodiment, a method for generating a virtual viewpoint image is provided. The method includes: obtaining at least one input viewpoint image and warping pixels of the at least one input viewpoint image to a virtual viewpoint image coordinate system; mapping a patch to a first pixel of a plurality of pixels warped to the virtual viewpoint image coordinate system when a difference between a first depth value of the first pixel and a second depth value of a second pixel adjacent to the first pixel is less than or equal to a predetermined threshold and mapping no patch to the first pixel when the difference is greater than the predetermined threshold; and generating the virtual viewpoint image by blending the plurality of pixels and/or the patch.

The first depth value of the first pixel may be smaller than the second depth value of the second pixel.

The generating the virtual viewpoint image by blending the plurality of pixels and/or the patch may include: allocating a weight to each of the plurality of pixels based on a distribution of depth values of the plurality of pixels; and blending the plurality of pixels and/or the patch based on the weight.

The allocating a weight to each of the plurality of pixels based on a distribution of depth values of the plurality of pixels may include allocating a relatively large weight to a pixel included in a dense distribution among the plurality of pixels and allocating a relatively small weight to a pixel included in a sparse distribution among the plurality of pixels.

The blending the plurality of pixels and/or the patch based on the weight may include using the pixel included in the dense distribution in the blending while excluding the pixel included in the sparse distribution from the blending.

The generating the virtual viewpoint image by blending the plurality of pixels and/or the patch may include allocating a relatively small weight to a relatively large patch, and allocating a relatively large weight to a relatively small patch.

The generating the virtual viewpoint image by blending the plurality of pixels and/or the patch may include: determining a first weight according to a distance between the plurality of pixels and the pixels of the at least one input viewpoint image; determining a second weight proportional to an inverse of depth values of the plurality of pixels; and determining a final weight by integrating the first weight and the second weight, and blending the plurality of pixels and/or the patch based on the final weight.

The generating the virtual viewpoint image by blending the plurality of pixels and/or the patch may include: allocating a relatively small weight to a first patch having a relatively large size, and allocating a relatively large weight to a second patch having a relatively small size; and blending the first patch and the second patch in consideration of the weight allocated to the first patch and the weight allocated to the second patch.

The generating the virtual viewpoint image by blending the plurality of pixels and/or the patch may include: determining a first weight according to a distance between the plurality of pixels and the pixels of the at least one input viewpoint image; determining a second weight proportional to an inverse of depth values of the plurality of pixel; determining a third weight based on a distribution of depth values of the plurality of pixels; determining a fourth weight according to a size of the patch; and determining a final weight by integrating the first weight, the second weight, the third weight, and the fourth weight, and blending the plurality of pixels and/or the patch based on the final weight.

According to another exemplary embodiment, an apparatus for generating a virtual viewpoint image is provided. The apparatus includes: a warping unit configured to warp a plurality of pixels of at least one input viewpoint image to a virtual viewpoint image coordinate system; and a blending unit configured to allocate weights to the plurality of pixels warped to the virtual viewpoint image coordinate system based on a distribution of depth values of the plurality of pixels and blend the plurality of pixels based on the weights.

The blending unit may be specifically configured to allocate a relatively large weight to pixels included in a dense distribution and allocate a relatively small weight to pixels included in a sparse distribution.

The blending unit may be further configured to use a plurality of pixels included in the dense distribution in the blending while excluding a pixel included in the sparse distribution from the blending.

The blending unit may be specifically configured to determine a first weight according to a distance between the plurality of pixels and a pixel of the at least one input viewpoint image, determine a second weight proportional to an inverse of depth values of the plurality of pixels, determine the final weight by integrating the first weight and the second weight, and blend the plurality of pixels based on the final weight.

The apparatus may further include a super-pixel mapper configured to map a super-pixel to a first pixel of the plurality of pixels based on a difference between a first depth value of the first pixel and a second depth value of a second pixel adjacent to the first pixel.

The super-pixel mapper may be further configured to map the super-pixel to the first pixel when the difference is less than or equal to a predetermined threshold and map no super-pixel to the first pixel when the difference is greater than the predetermined threshold.

The blending unit may be specifically configured to determine a pixel having a smallest depth value among a plurality of first pixels as a representative pixel of a first input viewpoint image of at least one input viewpoint image when the plurality of first pixels are warped from the first input viewpoint image to a first location of the virtual viewpoint image coordinate system.

The blending unit may be further configured to allocate a relatively small weight to a super-pixel having a relatively large size and allocate a relatively large weight to a super-pixel having a relatively small size.

The blending unit may be specifically configured to determine a first weight according to a distance between the plurality of pixels and a pixel of the at least one input viewpoint image, determine a second weight proportional to an inverse of depth values of the plurality of pixels, determine a third weight based on a distribution of depth values of the plurality of pixels, determine a final weight by integrating the first weight, the second weight, and the third weight, and blend the plurality of pixels based on the final weight.

The blending unit may be further configured to determine a first weight according to a distance between the plurality of pixels to a pixel of the at least one input viewpoint image, determine a second weight proportional to an inverse of depth values of the plurality of pixels, determine a third weight based on a distribution of depth values of the plurality of pixels, determine a fourth weight according to a size of the super-pixel, determine a final weight by incorporating the first weight, the second weight, the third weight, and the fourth weight, and blend the plurality of pixels and/or the super-pixel based on the final weight.

According to yet another exemplary embodiment, an apparatus for generating a virtual viewpoint image is provided. The apparatus includes: a processor and a memory, wherein the processor executes a program included in the memory to perform: warping pixels of at least one input viewpoint image obtained from an imaging device to a virtual viewpoint image coordinate system; mapping a patch to a first pixel of a plurality of pixels warped to the virtual viewpoint image coordinate system when a difference between a first depth value of the first pixel and a second depth value of a second pixel adjacent to the first pixel is less than or equal to a predetermined threshold and mapping no patch to the first pixel when the difference is greater than the predetermined threshold; and generating the virtual viewpoint image by blending the plurality of pixels and/or the patch.

DETAILED DESCRIPTION OF THE EMBODIMENTS

Figure 1:
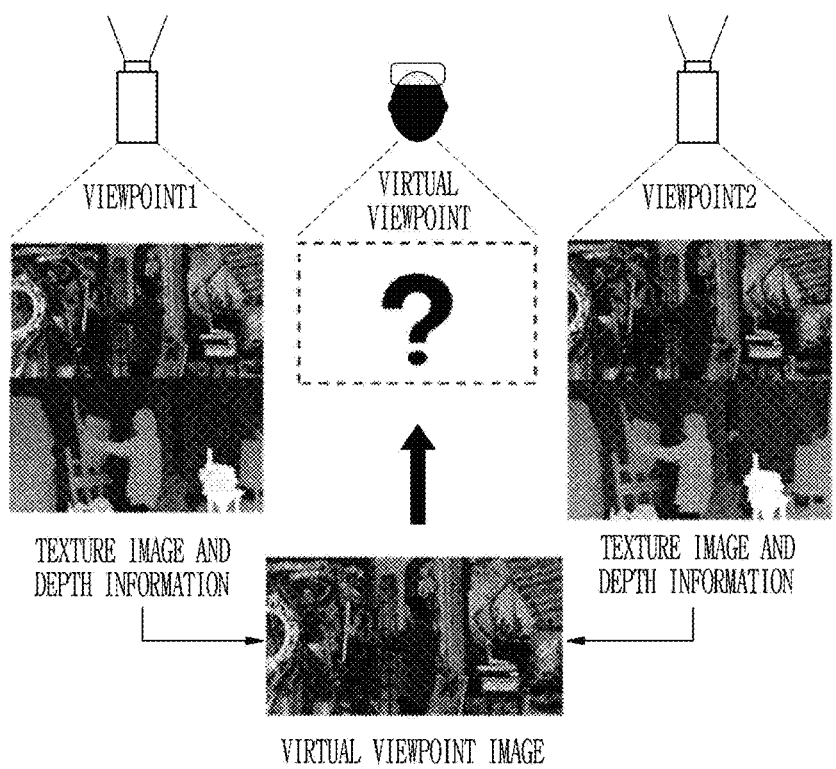
FIG. 1 is a conceptual diagram illustrating a method for generating a mid-view image of an intermediate position between a viewpoint 1 and a viewpoint 2.
Figure 2:
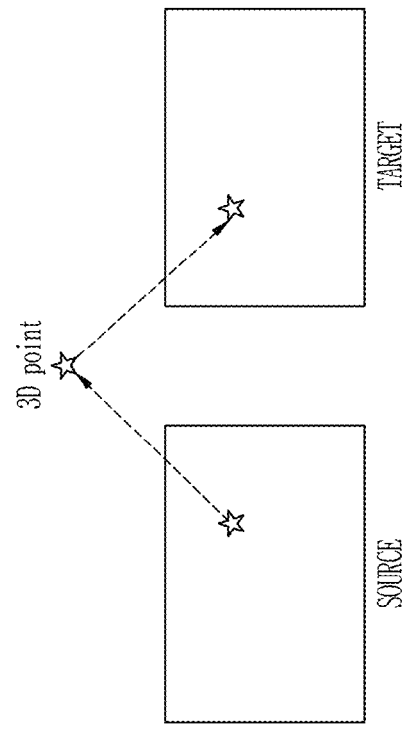
FIG. 2 is a conceptual diagram illustrating a method for generating a mid-view image using 3D warping.
Figure 2:
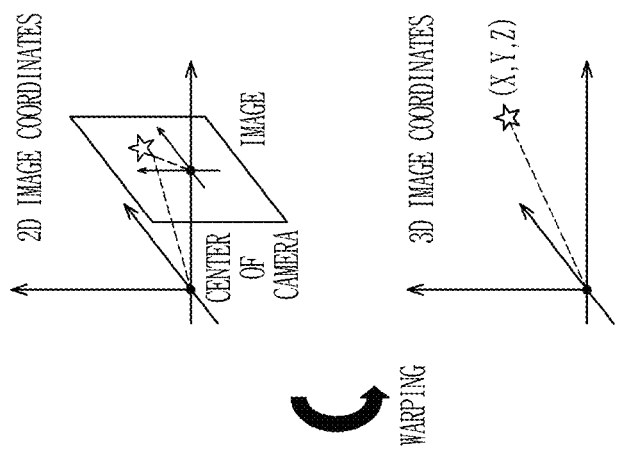
Figure 3:
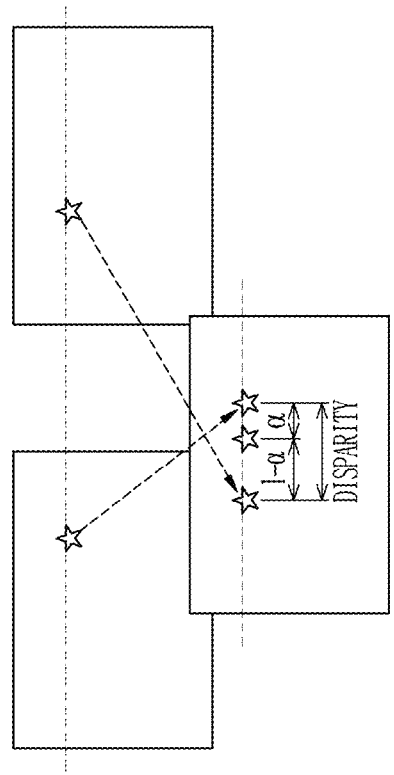
FIG. 3 is a conceptual diagram illustrating a method for generating a mid-view image using a disparity.
Figure 3:
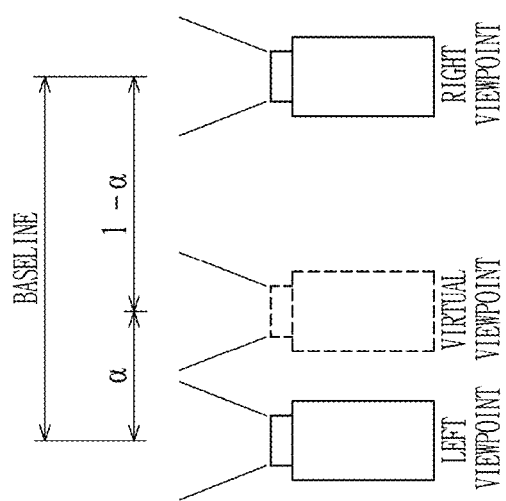

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Figure 4:
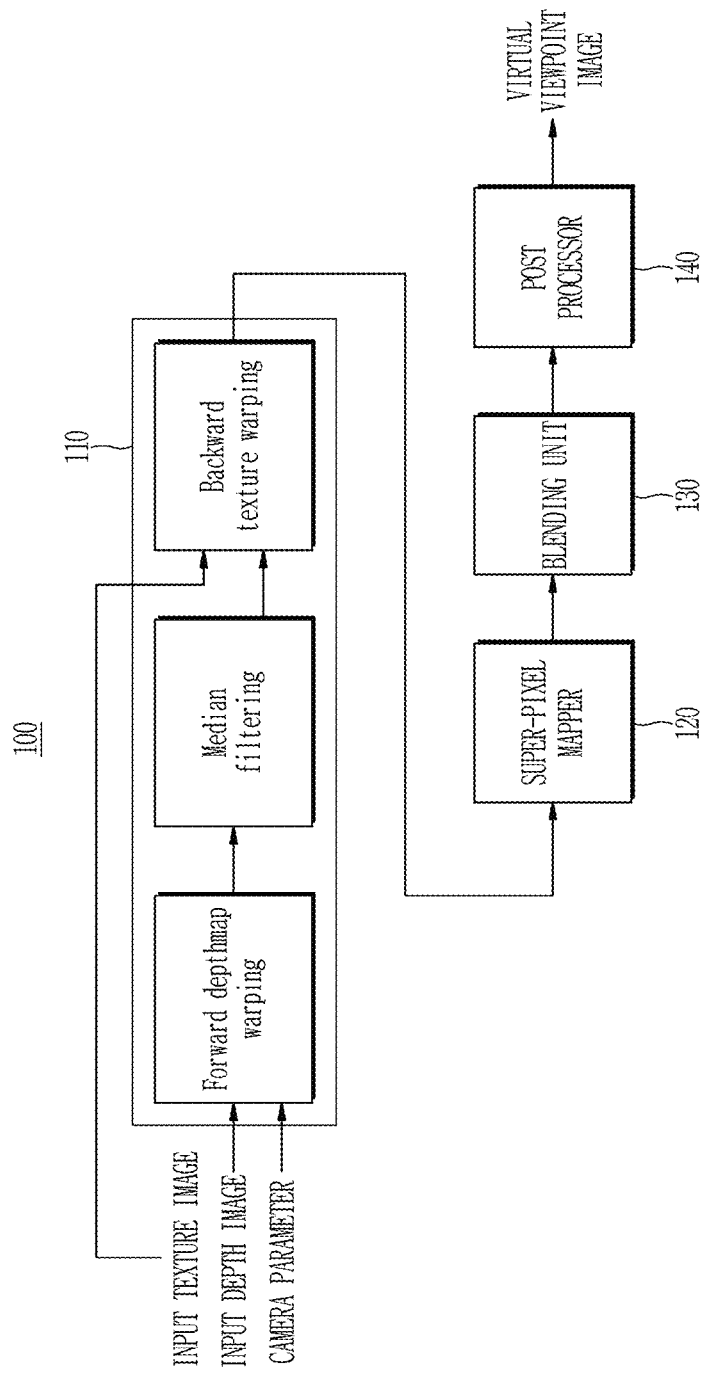
FIG. 4 is a block diagram illustrating an apparatus for generating a virtual viewpoint image according to an exemplary embodiment.
Figure 5:
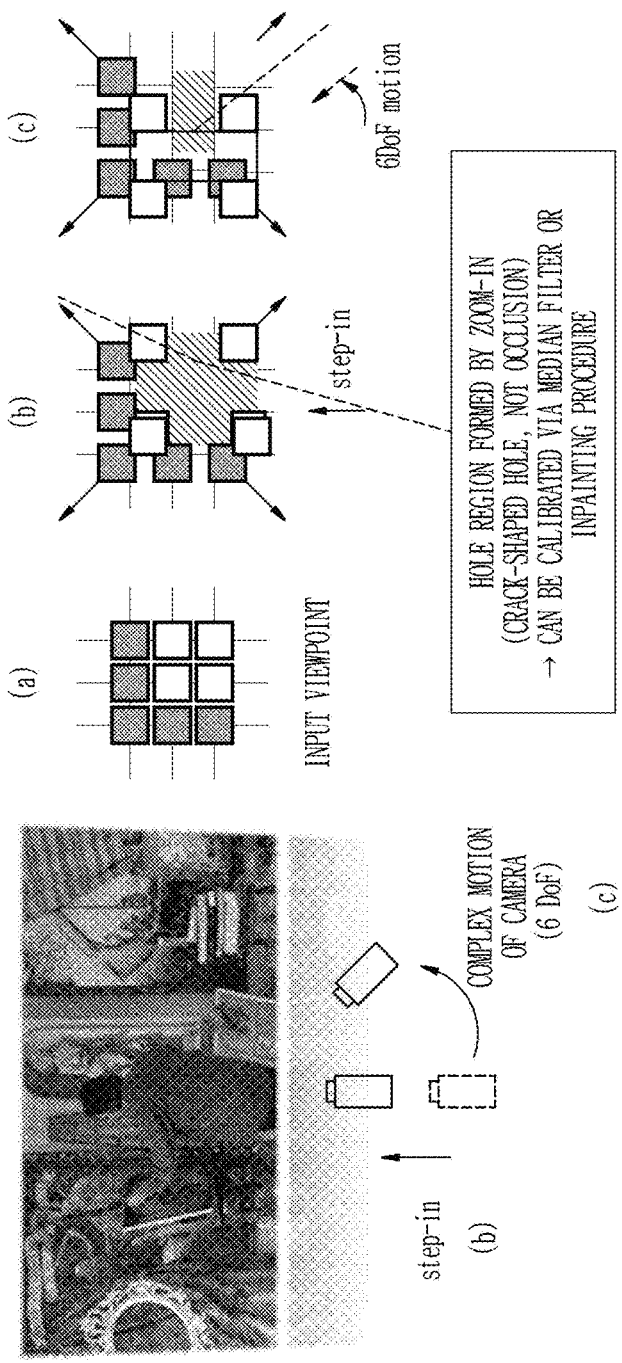
FIG. 5 is a conceptual diagram illustrating an environment in which a 6-DoF image is provided according to an exemplary embodiment.
Figure 6A:
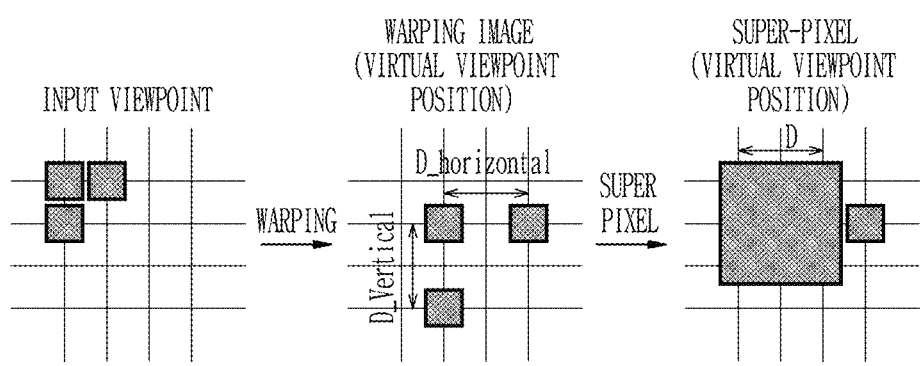
FIG. 6A and FIG. 6B are conceptual diagrams illustrating the super-pixel technique according to an exemplary embodiment.
Figure 6B:
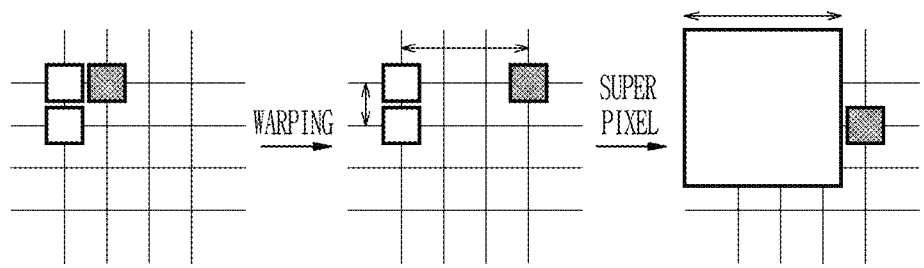

FIG. 4 is a block diagram illustrating an apparatus for generating a virtual viewpoint image according to an exemplary embodiment, FIG. 5 is a conceptual diagram illustrating an environment in which a 6-DoF image is provided according to an exemplary embodiment, and FIG. 6A and FIG. 6B are conceptual diagrams illustrating the super-pixel technique according to an exemplary embodiment.

Referring to FIG. 4, an image generating apparatus 100 generating a virtual viewpoint image includes a warping unit 110, a blending unit 130, and a post processor 140. The warping unit 110 performs forward depth-map warping on an image of an input viewpoint forwarded from at least one imaging apparatus such as a camera, median filtering, and backward texture warping. The blending unit 130 performs image blending on at least one image warped to the image coordinate system of the virtual viewpoint. Since the method of generating the virtual viewpoint image using the disparity cannot reflect the geometric structure of a scene of an image, it may be mainly used to generate a relatively simple intermediate viewpoint image. The image generating apparatus 100 according to the exemplary embodiment may use 3-dimensional (3D) warping scheme to generate a virtual viewpoint image of a specific location.

In the image generation method of the virtual viewpoint using the 3D warping scheme, a depth image input in the forward depth-map warping is warped to the virtual viewpoint location using camera parameter information. Then, the median filtering may be performed on the forward warped depth image. The median filtering is performed to fill small crack-shaped holes which may occur when pixels are mapped to an integer coordinate system of virtual viewpoint image locations through filtering. Backward warping is performed on a texture value from the input texture image by using the forward warped depth image in which some of the small holes is filled. Then, each of the backward warped texture images are synthesized into one virtual viewpoint image through weighted blending. For the blending of the backward warped texture image, Baseline information between the input viewpoint camera and the virtual viewpoint position may be used as a blending weight or depth information of a plurality of pixels warped to a pixel position of the virtual viewpoint may be used. The post-processing step is a process for improving quality of the blended image through post-correction algorithm. As the post-correction algorithm, a technique of filling a common hole area caused by occlusion or the like with in-painting may be applied.

The three-dimensional warping technique of synthesizing the virtual viewpoint image on a pixel basis may have difficulty in providing a user with a smooth viewpoint image of a 6-degree of freedom (DoF). Providing a viewpoint image of the 6-degree DoF means that providing the user with motion parallax according to 3-DoF of rotational movement in the direction of roll, yaw, and pitch and 3-DoF of translational movement in the direction of front-rear, up-down, and left-right. Referring to FIG. 5, a problem is shown that can occur when the combined view of the rotational and translational moves. FIG. 5 shows nine pixels of an input viewpoint image, with white pixels representing the foreground and gray pixels representing the background. If the virtual viewpoint location (i.e., the virtual camera in the left figure) is step-in as shown in (b), the distance between the pixels that have been mapped to the integer coordinate system of the input viewpoint is widened (cracked apart) due to the zoom-in effect. Therefore, small holes such as cracks may occur between the pixels. For example, a large hole may be caused between foreground pixels (that is, pixels having a small depth value) located near the camera. In this case, the holes can be corrected in the post-processing step. However, when the virtual camera shows a complex motion with a high degree of freedom such as (c), a background pixel may be mapped to the crack between the pixels of the foreground object. In this case, since the cracks to which the background pixels are mapped are not distinguished as holes, they are not able to be corrected in the post-processing step and remain in the final synthesized image, causing a deterioration of the quality of the image.

In order to solve this problem, the image generating apparatus 100 according to an exemplary embodiment may further include a super-pixel mapper 120. The super-pixel mapper 120 according to the exemplary embodiment may map the super-pixels to the warped pixels when pixels adjacent to each other in the image coordinates of the input viewpoint are warped to the image coordinate system of the virtual viewpoint image and the distance between the pixels is widened. The super-pixel may be a patch or a pixel extended in the form of the patch. The size of the super-pixel may be determined according to the distance between the pixels, and the depth value of the super-pixel may be determined as the depth value of the pixel to which the super-pixel is mapped. Referring to FIG. 6A, after each pixel in the input viewpoint image is warped to the image coordinate system of the virtual viewpoint, distances apart from each other in the horizontal direction (D_horizontal) and in the vertical direction (D_vertical) are calculated. Then a square super-pixel having larger distance of the two distances as one side length (D=max (D_horizontal, D_vertical)) are mapped. The problem in which the background pixel is mapped between cracks caused by the widening of pixels of the foreground object may be reduced through the super-pixels. In the super-pixel method, however, since only the distances of adjacent pixels within the image coordinate system are compared regardless of the geometry of the scene, a problem may occur in the super-pixel method when the depth values of each of the adjacent pixels are significantly different. Referring to FIG. 6B, the distance between two pixels representing the foreground is close, but the distance between the white pixel representing the foreground and the gray pixel representing the background is far. Between the foreground pixel and the background pixel should be treated as a hole, not a crack, but in the super-pixel technique, a super-pixel having a large size may be mapped to the between them, resulting in a scene distortion. In addition, in the super-pixel technique, geometric relationships between pixels (for example, a consideration about the direction or a distance from which the warped pixels are apart) may be ignored, and the square-shaped super-pixels are uniformly mapped, which may cause the distortion. If there is a distortion due to the super-pixel between the foreground object and the background, a problem such as blur may occur in the final synthesized image in which the image blending and post-processing are performed.

Figure 7:
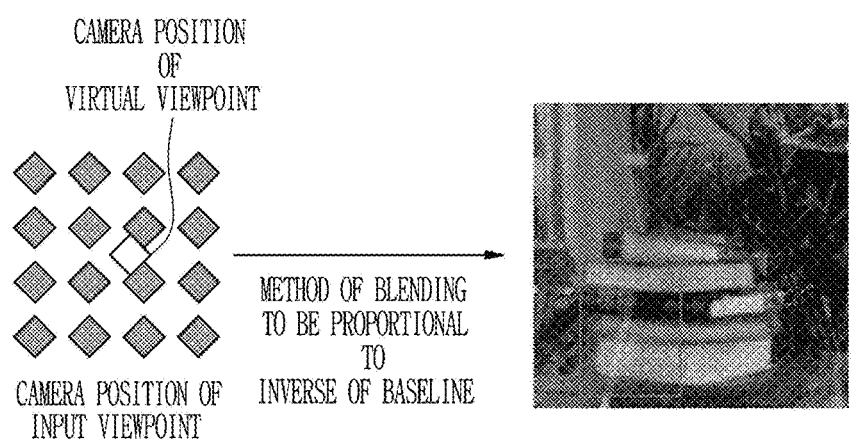
FIG. 7 is a conceptual diagram illustrating a method for determining a first weight for a blending procedure and a virtual viewpoint image according to an exemplary embodiment.
Figure 8:
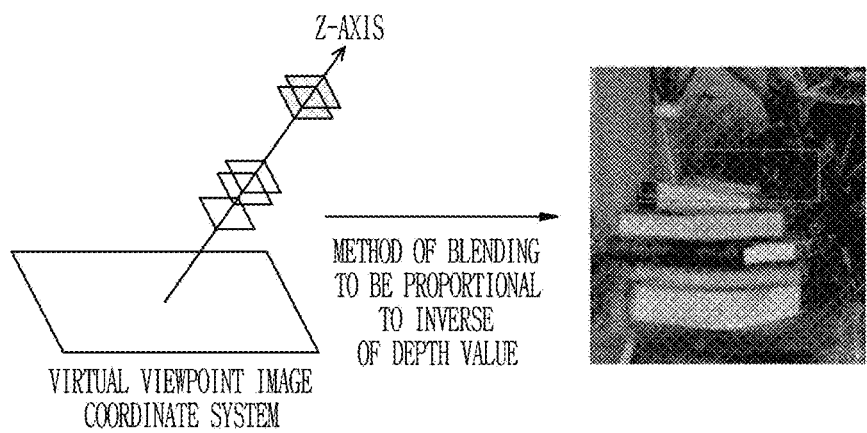
FIG. 8 is a conceptual diagram illustrating a method for determining a second weight for a blending procedure and a virtual viewpoint image according to another exemplary embodiment.

FIG. 7 is a conceptual diagram illustrating a method for determining a first weight for a blending procedure and a virtual viewpoint image according to an exemplary embodiment, and FIG. 8 is a conceptual diagram illustrating a method for determining a second weight for a blending procedure and a virtual viewpoint image according to another exemplary embodiment.

When blending the each of the warped images, the blending unit 130 may use a method of performing a weighted average based on a weight determined according to a baseline between the virtual viewpoint position and the input viewpoint position (that is, a method of blending warped pixels in proportion to the inverse of the baseline) or a method of performing a weighted average based on depth values of plurality of pixels mapped to one pixel location in the image coordinate system of the virtual viewpoint image (that is, a method of blending warped pixels in proportion to the inverse of the depth value).

Referring to FIG. 7, the blending unit 130 may allocate a first weight proportional to the inverse of the baseline to each warped pixel. When blending is performed, warping errors are generally small because information at relatively close input viewpoint is mainly used. However, since consideration regarding the depth of the pixels is not included in the weight according to the baseline, it is difficult to distinguish between the foreground pixel and the background pixel, and after blending, the background may be seen transparent over the foreground (see inside of the box in the right picture).

Referring to FIG. 8, the blending unit 130 may allocate a second weight proportional to the inverse of the depth value to each warped pixel. A transparent background may be alleviated because the weight is applied based on depth values when blending is performed, but high weights are incorrectly given to the warped pixels from an image at an input viewpoint far from a specific viewpoint in the virtual view coordinate system (see inside of the box in the left picture).

Figure 9:
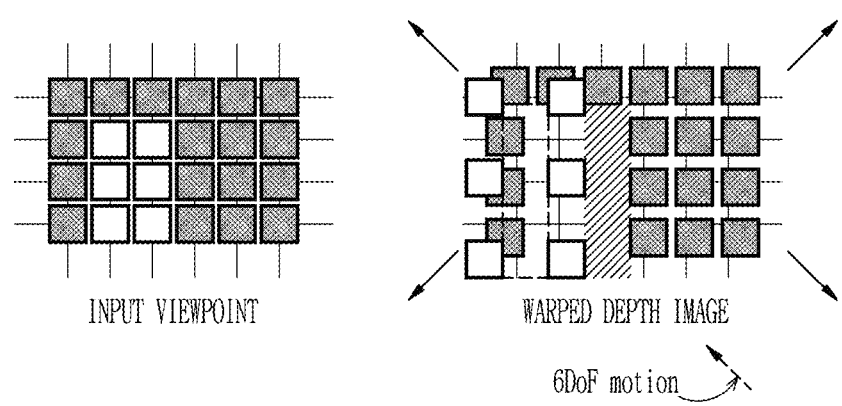
FIG. 9 is a conceptual diagram illustrating a hole to which a super-pixel is mapped according to an exemplary embodiment.
Figure 10:
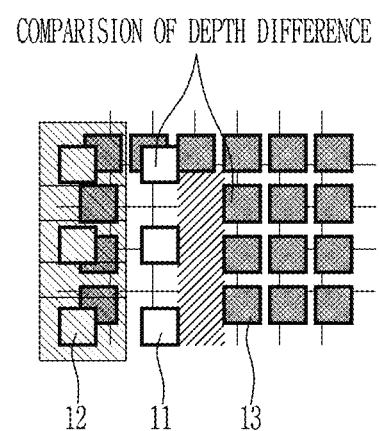
FIG. 10 is a conceptual diagram illustrating a method for mapping a super-pixel according to an exemplary embodiment.
Figure 11:
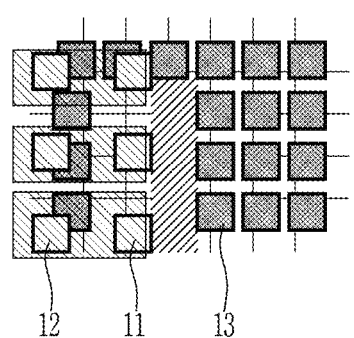
FIG. 11 is conceptual diagram illustrating a method for mapping a super-pixel according to another exemplary embodiment.

FIG. 9 is a conceptual diagram illustrating a hole to which a super-pixel is mapped according to an exemplary embodiment, FIG. 10 is a conceptual diagram illustrating a method for mapping a super-pixel according to an exemplary embodiment, and FIG. 11 is conceptual diagram illustrating a method for mapping a super-pixel according to another exemplary embodiment.

Referring to FIG. 9, when the location of the virtual viewpoint, which may be represented by the complex motion of the virtual camera, moves with high degrees of freedom, a hole at which a plurality of foreground pixels and background pixels overlaps or the pixels are not warped may be generated in the warped depth image. In this case, according to the method for mapping the super-pixel according to the exemplary embodiment, even if two warped pixels adjacent to each other are separated by a predetermined distance, the super-pixel mapper 120 may not map the super-pixel to the hole when a difference between the depth values of the two warped pixels is relatively large.

Referring to FIG. 10, a first pixel 11 and a second pixel 12 are foreground pixels and a third pixel 13 is a background pixel among a plurality of pixels warped in the image coordinate system. Since the first pixel 11 and the second pixel 12 are farther apart than the predetermined distance, the super-pixel mapper 120 may map the super-pixels to the first pixel 11 and the second pixel 12, respectively. Since the first pixel 11 and the third pixel 13 are also farther apart than the predetermined distance, but the difference between the depth value of the first pixel 11 and the depth value of the third pixel 13 is greater than a predetermined threshold, the super-pixel mapper 120 may not map the super-pixel to the first pixel 11. That is, since the first pixel 11 and the second pixel 12 are both foreground pixels, the difference between the depth values of the two pixels is smaller than the predetermined threshold, and therefore, super-pixels may be mapped to the first pixel 11 and the second pixel 12, respectively. However, the third pixel 13 is a background pixel, so the difference between the depth value of the first pixel 11 and the depth value of the third pixel 13 is greater than the predetermined threshold. Finally, the super-pixel mapper 120 may not map the super-pixel to the first pixel 11 that is the foreground pixel.

The super-pixel mapper 120 may determine a size and a shape of the super-pixel according to the distance between the pixel to which the super-pixel is to be mapped and the adjacent pixel and the depth value of the adjacent pixel. For example, a length of each side of the super-pixel may be determined through integer transformation (rounding, rounding up, rounding down, ceiling function, floor function, etc.) on the horizontal distance and vertical distance between the pixel to which the super-pixel is to be mapped and the adjacent pixel. Referring to FIG. 11, the super-pixel is mapped to the second pixel 12, but the super-pixel is not mapped to the first pixel 11 as described above. In this case, the shape of the super-pixel mapped to the second pixel 12 may vary according to the gap from the second pixel 12 to the first pixel 11, which is an adjacent pixel, and the depth value of the first pixel 11. Comparing FIG. 10 with FIG. 11, the shape of the super-pixel 20 mapped to the second pixel 12 does not overlap with the super-pixel mapped below (contracting in the vertical direction), and extends to the first pixel 11 (extending in the horizontal direction), so that the shape of the super-pixel 20 can be a rectangular. The super-pixel mapper 120 according to the exemplary embodiment may determine the length of each side of the super-pixel based on the gap between adjacent foreground pixels and the gap between adjacent super-pixels. Referring to FIG. 11, the horizontal side of the super-pixel 20 mapped to the second pixel 12 may extend to cover the first pixel 11, which is an adjacent foreground pixel. The vertical side of the super-pixel 20 of FIG. 11 may contract so as not to overlap with the adjacent super-pixel.

Figure 12:
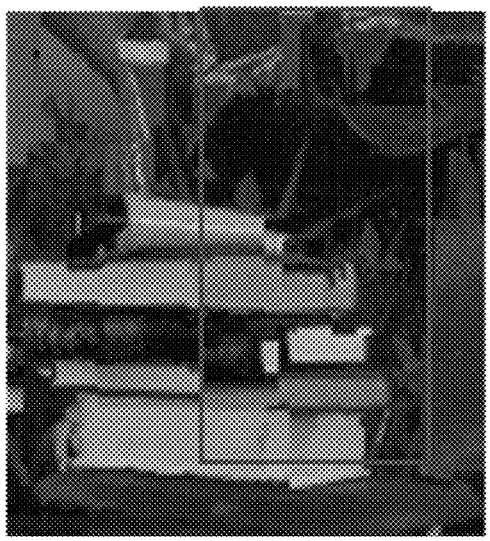
FIG. 12 illustrates a warped image and a blended image by a conventional super-pixel mapping method.
Figure 12:
Figure 13:
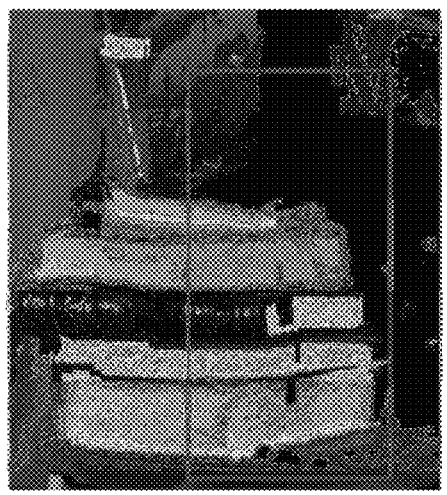
FIG. 13 illustrates a warped image and a blended image by a super-pixel mapping method according to an exemplary embodiment.
Figure 13:
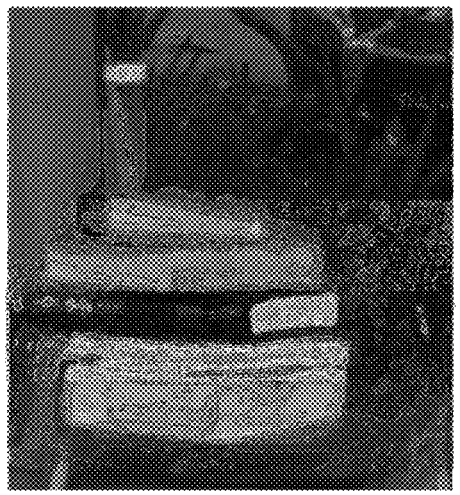

FIG. 12 illustrates a warped image and a blended image by a conventional super-pixel mapping method, and FIG. 13 illustrates a warped image and a blended image by a super-pixel mapping method according to an exemplary embodiment.

The left picture of FIG. 12 is a warped image generated by warping pixels of an input viewpoint image to an image coordinate system of a virtual viewpoint according to a conventional super-pixel mapping method, and the right picture of FIG. 12 is a blended image synthesized by a blending operation of the pixels of the warping image on the left picture of FIG. 12. The left picture of FIG. 13 is a warped image generated by warping pixels of an input viewpoint image to an image coordinate system of a virtual viewpoint according to a super-pixel mapping method of the exemplary embodiment, and the right picture of FIG. 13 shows blended image synthesized by a blending operation of the pixels of the warping image on the left picture of FIG. 13.

Comparing FIG. 12 with FIG. 13, in FIG. 13, the effect of the super-pixel is maintained in the inner area of the foreground object (a few books), and the super-pixel is not mapped but left as a hole in the boundary area between the foreground object and the background object. The boundary area left behind by black holes can be corrected through a later operation. In addition, since the shape of the super-pixel mapped to the foreground pixel is changed according to the shape or the depth value of the foreground object, the shape of the object may be preserved without deformation. Further, distortion and blurring can be reduced even in the blending operation.

According to the super-pixel mapping method of the exemplary embodiment as described above, it is determined whether or not the super-pixel is mapped based on the difference in depth value between adjacent pixels, and the size and the shape of the super-pixel may be determined according to the distance between the pixels to which the super-pixel is to be mapped, so that the blurring in the hole area between the object and the background can be reduced.

Figure 14:
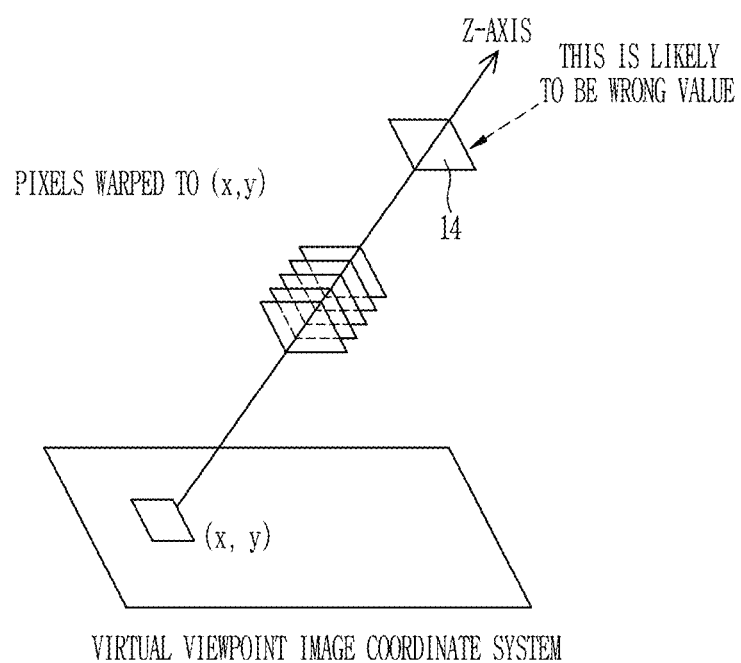
FIG. 14 is a conceptual diagram illustrating pixels warped to a point of a virtual viewpoint image coordinate system according to an exemplary embodiment.
Figure 15:
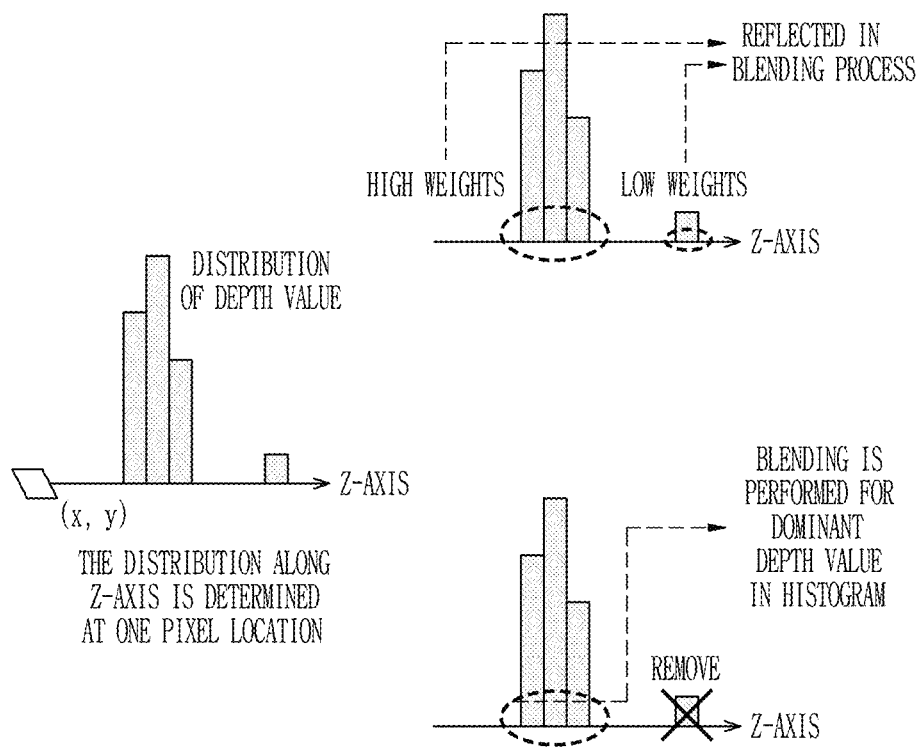
FIG. 15 is a conceptual diagram illustrating a method for determining a third weight based on a depth value distribution according to an exemplary embodiment.

FIG. 14 is a conceptual diagram illustrating pixels warped to a point of a virtual viewpoint image coordinate system according to an exemplary embodiment, and FIG. 15 is a conceptual diagram illustrating a method for determining a third weight based on a depth value distribution according to an exemplary embodiment.

Referring to FIG. 14, a plurality of pixels warped to a point (x, y) of the virtual viewpoint image coordinate system is distributed according to a depth value along the z axis. In FIG. 14, the fourth pixel 14 has a depth value different from that of another pixel warped at the point (x, y). That is, unlike the fourth pixel 14, a plurality of pixels having similar depth values and adjacently distributed on the z axis may be determined to be correctly warped (that is, the plurality of pixels distributed adjacent to each other on the z axis may have mutually high reliability). On the other hand, unlike a plurality of pixels distributed adjacent to each other on the z-axis, the fourth pixel 14 (outlier) positioned far apart on the z-axis may be determined to be incorrectly warped.

The blending unit 130 according to the exemplary embodiment may determine a third weight for each pixel based on a distribution of depth values of a plurality of pixels warped to a point on the virtual viewpoint image coordinate system, and perform a blending operation in consideration of the determined weight. The plurality of pixels warped to the point in the virtual viewpoint image coordinate system may have been warped from two or more input viewpoint images or warped from one input viewpoint image. When a plurality of pixels in one input viewpoint image is warped to the point in the virtual viewpoint image coordinate system, it may be determined that the pixel having the smallest depth value among the plurality of pixels (i.e., the most foreground pixel) is warped from the one input viewpoint image. For example, the blending unit 130 may determine the pixel having the smallest depth value among the plurality of pixels warped from the one input viewpoint image as a representative pixel of the one input viewpoint image. That is, when the pixels are warped from a plurality of input viewpoint images, the foremost pixel of each input viewpoint image may be regarded as being warped to the point of the virtual viewpoint image coordinate system, and the blending unit 130 may perform the image blending by using the representative pixels of each input viewpoint image. Referring to FIG. 15, a large weight may be allocated to a plurality of pixels included in a dense distribution on the z axis for a depth value, and a relatively small weight may be allocated to at least one pixel included in a sparse distribution. The magnitude of the weight allocated to each pixel may be determined according to the density of the pixels on the z-axis. Alternatively, the blending unit 130 may use at least one pixel group included in the dense distribution on the z-axis for blending, and exclude the at least one pixel included in the sparse distribution from the blending.

Figure 16:
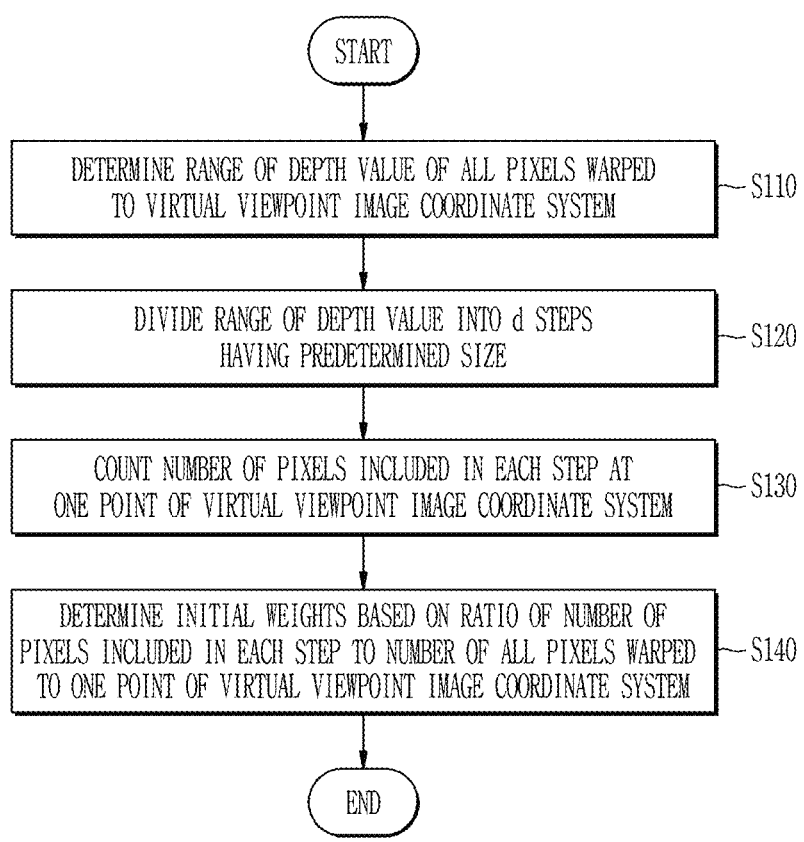
FIG. 16 is a flowchart illustrating a method for determining blending weights according to an exemplary embodiment.

FIG. 16 is a flowchart illustrating a method for determining blending weights according to an exemplary embodiment, and FIGS. 17A to 17F are conceptual views illustrating each step of a method for determining blending weights according to an exemplary embodiment.

Figure 17A:
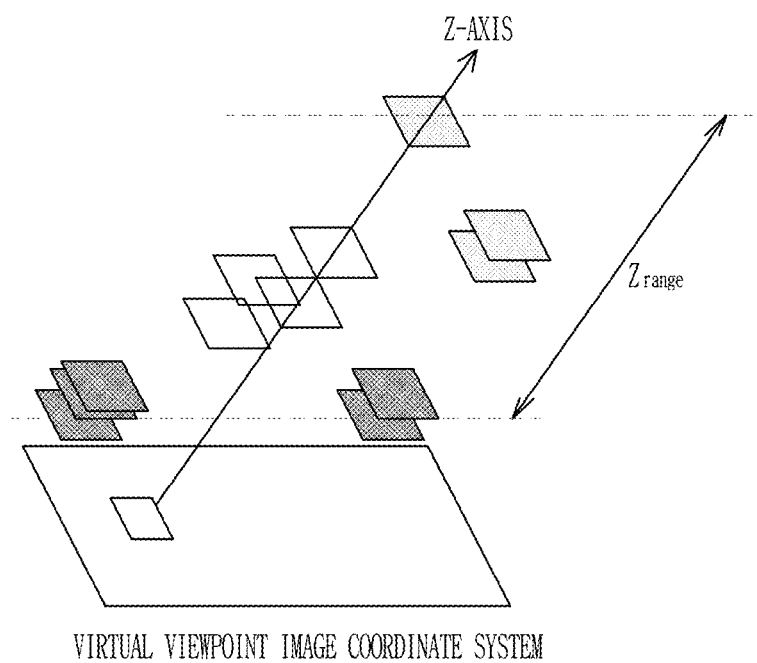
FIGS. 17A to 17F are conceptual views illustrating each step of a method for determining blending weights according to an exemplary embodiment.
Figure 17B:
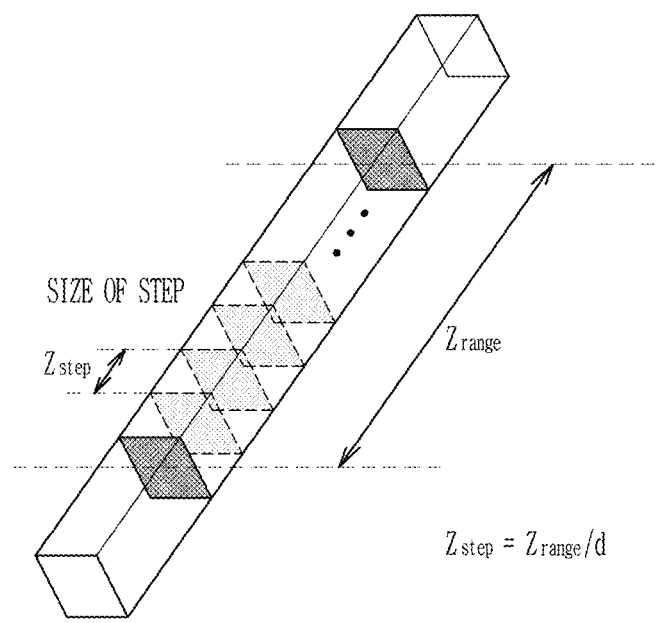
Figure 17C:
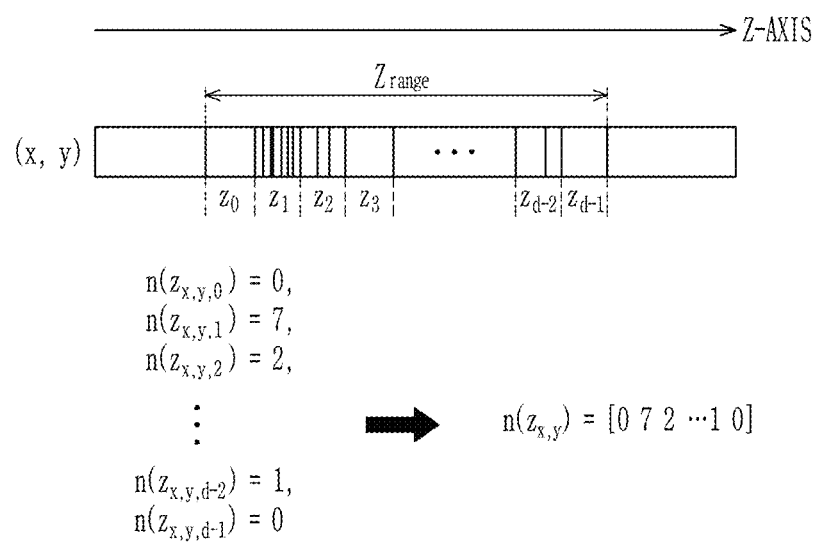
Figure 17D:
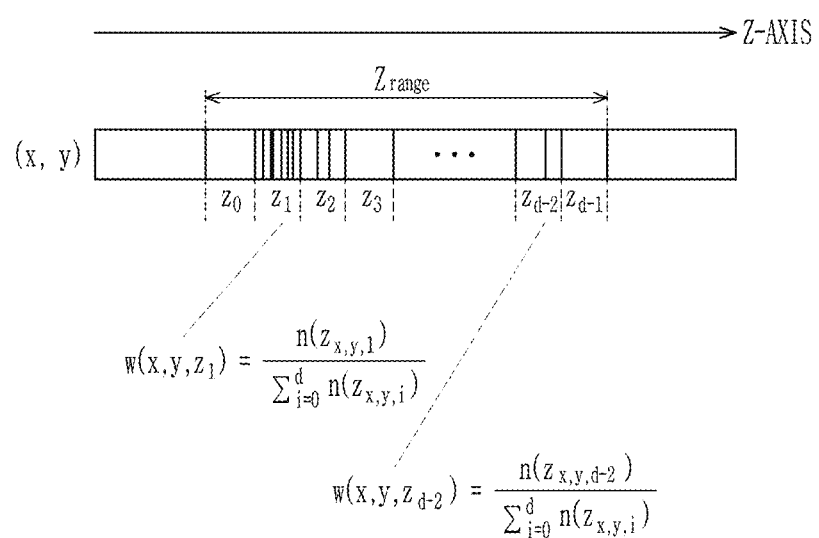

The blending unit 130 according to an exemplary embodiment may determine a third weight of each pixel warped to a point of the virtual viewpoint image coordinate system, and perform the blending operation based on the determined third weight. Referring to FIG. 16, the blending unit 130 determines a range of depth values of all pixels warped to the point for each point in the virtual viewpoint image coordinate system (S110). Referring to FIG. 17A, the range of the depth values of all pixels warped to the point of the virtual viewpoint image coordinate system is determined as $Z_{range}$. The blending unit 130 divides the range $Z_{range}$ of the depth value into d steps having a predetermined size $Z_{step}$ (S120). Referring to FIG. 17B, each of the d steps may have the predetermined size $Z_{step}$, and may cluster a real depth value into the predetermined scale. Then, the blending unit 130 counts the number n $(z_{x,y,i})$ of pixels included in each step $z_i$ clustered in the predetermined scale at one point of the virtual viewpoint image coordinate system (S130). Referring to FIG. 17C, in the steps $z_0, z_1, \ldots, z_{d-1}$, 7 pixels are counted in the $z_1$, two pixels are counted in the $z_2$, and 1 pixel is counted in the $z_{d-2}$. Then, the blending unit 130 determines an initial weight of each pixel based on a ratio of the number of pixels included in each step to the number of all pixels warped to the point of the virtual viewpoint image coordinate system (S140). For example, the initial weight $w(x,y,z_i)$ of the pixels included in each step may be determined as Equation 1 below.

$$w(x, y, z_i) = \frac{n(x, y, z_i)}{\sum_{i=0}^{d} n(z_i)} \qquad \text{[Equation 1]}$$

Referring to Equation 1, the initial weight may indicate a probability that a pixel of one point (x, y) in the virtual viewpoint image coordinate system is included in the step $z_i$. For example, the initial weight of each pixel included in the step $z_1$ and $z_{d-2}$ is represented by Equation 2 below.

$$w(x, y, z_1) = \frac{7}{7+2+1} = 0.7 \qquad \text{[Equation 2]}$$
$$w(x, y, z_{d-2}) = \frac{1}{7+2+1} = 0.1$$

Figure 17E:
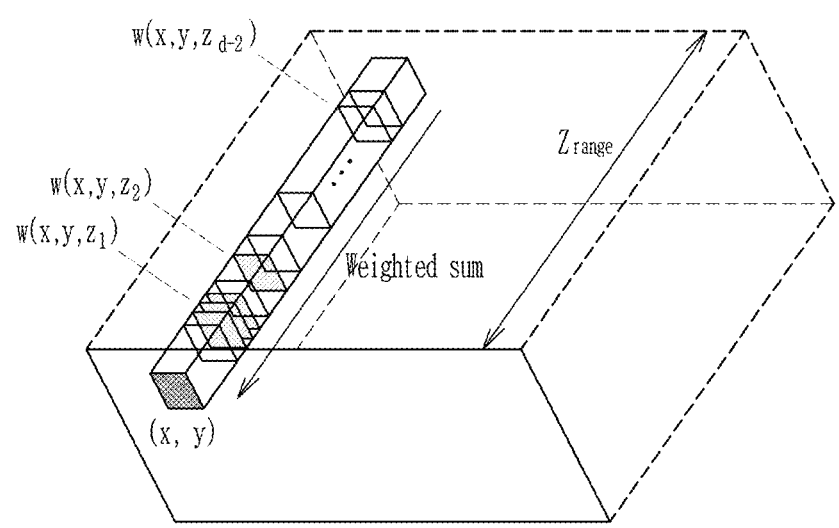
Figure 17F:
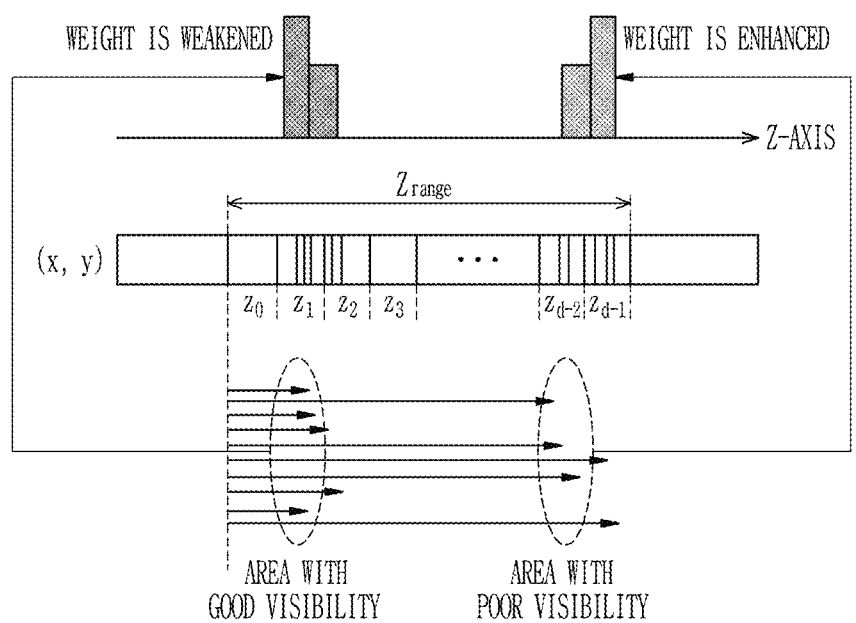

The initial weights may be applied to the blending operation as they are, or may be applied to the blending operation after additional operations (e.g., square operations, etc.) have been performed on the initial weights. The additional operations may be applied to enhance the weighting effect. Referring to FIG. 17E, the initial weight may be applied to the image blending operation through a weighted sum operation. Alternatively, when there are two or more sections where the depth values of the pixels are densely distributed, the weight of the pixel having the relatively larger depth value may be enhanced. That is, the blending unit 130 according to an exemplary embodiment may further reinforce the weight according to the visibility of the pixel by further strengthening the weight of the pixel having the relatively larger depth value among two or more pixel clusters in which the density distribution is located. Referring to FIG. 17F, when a similar number of pixels are distributed in a $z_1$ step having a relatively small depth value and a $z_{d-1}$ step having a relatively large depth value, the blending unit 130 according to an exemplary embodiment may adjust the magnitude of the weight according to the visibility of the pixel by weakening the weight of the $z_1$ step and increasing the weight of the $z_{d-1}$ step. That a large number of pixels having a depth value corresponding to the step $z_{d-1}$ at one point (x, y) of the virtual viewpoint image coordinate system means that there are fewer other pixels veiling the pixels included in the interval $z_{d-1}$. That is, although observation of the $z_1$ depth area is possible, pixels having the depth value corresponding to the $z_{d-1}$ step are warped and mapped. Accordingly, the blending unit 130 may determine that the at least one pixel in the step $z_{d-1}$ has a relatively higher reliability than the pixels mapped to a high visibility area (i.e., a pixel having a relatively small depth value), and further enhance the intensity of the weight of the pixel in the step $z_{d-}$. The visibility of the pixel may be determined by the accumulation of the number of pixels having a depth value larger than a depth value corresponding to the step in which the pixel is included.

As described above, according to the exemplary embodiment, weights may be allocated based on the distribution of the depth values of the pixels warped to the point in the virtual viewpoint image coordinate system, and the relatively large weight may be allocated to the high density distribution, thereby reducing the influence of an outlier and the reliability of the image blending operation can be increased. In addition, the strength of the weights for the areas of good visibility and areas of poor visibility may be adjusted to further improve reliability.

Figure 18:
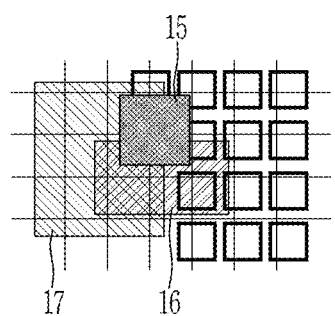
FIG. 18 and FIG. 19 are conceptual diagrams illustrating a method for determining a fourth weight based on the size of the super-pixel according to an exemplary embodiment.
Figure 19:
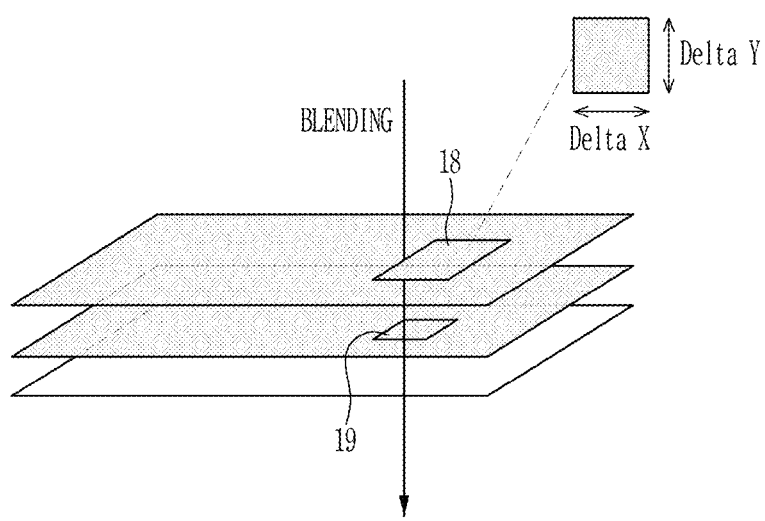

FIG. 18 and FIG. 19 are conceptual diagrams illustrating a method for determining a fourth weight based on the size of the super-pixel according to an exemplary embodiment.

The super-pixel mapping method may partially compensate for warped pixel-based viewpoint synthesis, but is inaccurate than pixels warped directly to a point in the virtual viewpoint image coordinate system. This is because, in reality, in the warped pixel-based method, pixels that will not actually be warped are approximated to one point using information of the adjacent pixel. Thus, when both the directly warped pixel and the super-pixel are mapped to a point in the virtual viewpoint image coordinate system, the reliability of the directly warped pixel may be higher. The blending unit 130 according to an exemplary embodiment may determine a fourth weight based on the sizes of the plurality of pixels corresponding to one point of the virtual viewpoint image coordinate system, and apply the determined fourth weight to the blending operation. For example, the weight may be inversely proportional to the length of the side (or large side) of the pixel (or proportional to the inverse of the length of the side) or inversely proportional to the size of the area of the pixel (or proportional to the inverse of the size of the area). Referring to FIG. 18, the order of the weights allocated to the fifth pixel 15, the sixth pixel 16, and the seventh pixel 17 may be $W_{15} > W_{16} > W_{17}$.

One warping image corresponding to the point of the image coordinate system of the virtual viewpoint may be determined based on a single pixel having the smallest depth value among the pixels warped to the point. In this case, the blending unit 130 may allocate a weight based on the size of the mapped super-pixel, and a low weight may be allocated to the large size super-pixel in the image blending process. Referring to FIG. 19, when the size of the eighth pixel 18 is larger than the size of the ninth pixel 19, since the weight corresponding to the inverse of the length of the side (or the longer side of the length) may be allocated to each pixel, a smaller weight may be allocated to the eighth pixel 18 than the ninth pixel 19. As described above, according to the exemplary embodiment, the weight is set according to the size of the super-pixel mapped to the individual warping image, and the small weight is allocated to the super-pixel, which is a large size, so that the distortion caused by the super-pixel in the image blending process can be reduced.

Figure 20:
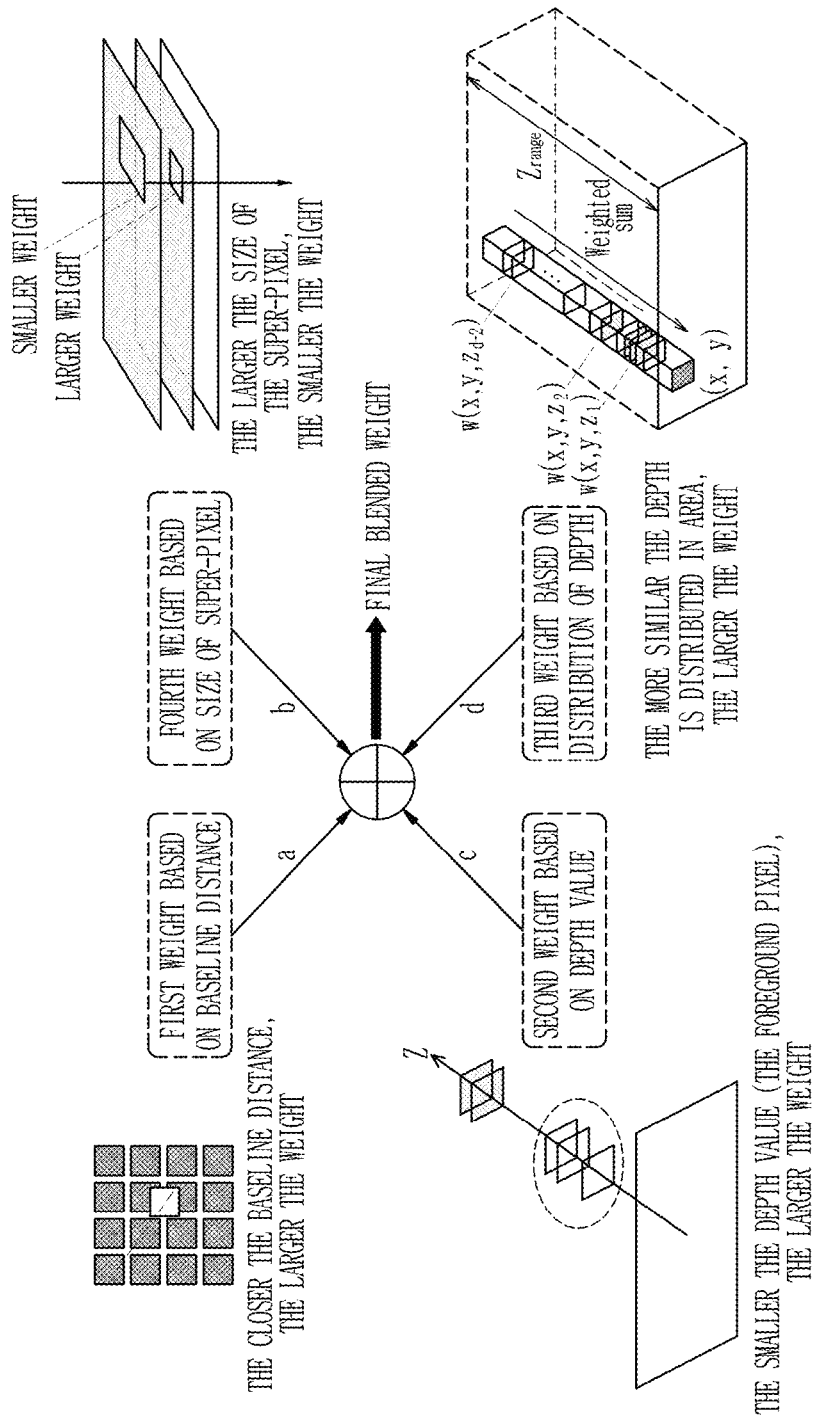
FIG. 20 is a conceptual diagram illustrating a method for determining a final weight according to an exemplary embodiment.

FIG. 20 is a conceptual diagram illustrating a method for determining a final weight according to an exemplary embodiment.

The blending unit 130 according to an exemplary embodiment may determine the final weight for one pixel by combining the first weight, the second weight, the third weight, and the fourth weight described above. The blending unit 130 may select at least one of the first weight, the second weight, the third weight, and the fourth weight and may allocate the at least one selected weight to the pixel. Alternatively, the blending unit 130 may select some of the first weight, the second weight, the third weight, and the fourth weight, and may integrate the selected some weights. Alternatively, the blending unit 130 may incorporate all of the first weight, the second weight, the third weight, and the fourth weight.

In FIG. 7 above, the first weight based on the baseline may reduce the warping error, but it is difficult to distinguish between the foreground pixel and the background pixel. In FIG. 8, the second weight based on the depth value is vulnerable to an error due to a wrongly warped foreground object from a remote input viewpoint. When these two weights are weighted averaged at an appropriate ratio, the two weights may be used complementarily. The third weight based on the distribution of depth values described above and the fourth weight based on the size of the super-pixel may also be integrated and used as the final weight. Referring to FIG. 20, the first weight based on the baseline, the second weight based on the depth value, the third weight based on the depth value distribution, and the fourth weight based on the size of the super-pixel may be integrated through the weighted averaging scheme and may be determined as the final weight. The integration ratio of the first weight, the second weight, the third weight, and the fourth weight may be expressed as a:b:c:d, and functions necessary for the image blending may be emphasized or removed by adjusting the weight integration ratio. According to an exemplary embodiment, the weight is calculated for each pixel of the virtual viewpoint image coordinate system, and the sum of the weights of the pixels located at one point of the virtual viewpoint image coordinate system is 1 (normalization). That is, according to the exemplary embodiment, the blending result may be improved by the weighted averaging of the baseline based weight, the depth value based weight, the depth value distribution based weight, and the super-pixel size-based weight.

Since the mapping of the super-pixel may be determined based on the difference in depth values between adjacent pixels and the size and the shape of the super-pixel may vary according to the distance between the pixels, blurring in the hole area between the objects and the background may be reduced. In addition, weights are allocated based on the distribution of depth values of the pixels warped to a point in the virtual viewpoint image coordinate system and a relatively large weight is allocated to the high density region, thereby reducing the influence of the outliers and increasing the reliability of the image blending. Additionally, the strength of the weights for the areas of good visibility and areas of poor visibility may be adjusted to further improve the reliability. Further, the weight is determined according to the size of the super-pixel mapped to the individual warped image, and a relatively low weight is allocated to the super-pixel having the large size, so that the distortion due to the super-pixel may be reduced in the image blending process. Furthermore, the blending result may be improved by weighted average of the baseline-based weight, the depth value-based weight, the depth value distribution-based weight, and the super-pixel size-based weight.

Figure 21:
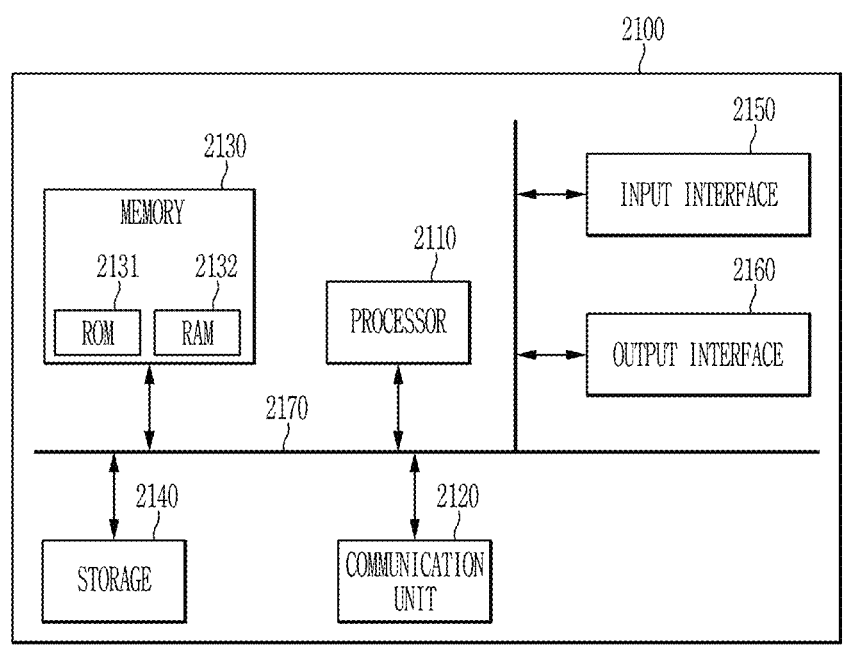
FIG. 21 is a block diagram illustrating an apparatus for generating a virtual viewpoint image according to another exemplary embodiment.

FIG. 21 is a block diagram illustrating an apparatus for generating a virtual viewpoint image according to another exemplary embodiment.

The apparatus for generating a virtual viewpoint image according to another exemplary embodiment may be implemented as a computer system, for example a computer readable medium. Referring to FIG. 21, a computer system 2100 may include at least one of processor 2110, a memory 2130, an input interface 2150, an output interface 2160, and storage 2140. The computer system 2100 may also include a communication unit 2120 coupled to a network. The processor 2110 may be a central processing unit (CPU) or a semiconductor device that executes instructions stored in the memory 2130 or storage 2140. The memory 2130 and the storage 2140 may include various forms of volatile or non-volatile storage media. For example, the memory may include read only memory (ROM) 2131 or random access memory (RAM) 2132. In the exemplary embodiment of the present disclosure, the memory may be located inside or outside the processor, and the memory may be coupled to the processor through various means already known.

Thus, embodiments of the present invention may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The network connection may transmit or receive a wired signal or a wireless signal.

On the contrary, the embodiments of the present invention are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for generating a virtual viewpoint image, the apparatus comprising:
    a warping processor configured to warp a plurality of pixels of at least one input viewpoint image to a virtual viewpoint image coordinate system;
    a super-pixel mapper configured to map a super-pixel to a first warped pixel of the plurality of warped pixels; and
    a blending processor configured to allocate weights to the plurality of warped pixels based on a distribution of depth values of the plurality of warped pixels, including identifying a number of warped pixels in a range of the distribution of the depth values to determine which warped pixel, of the plurality of warped pixels, belongs to either a dense distribution range or a sparse distribution range, and blend the plurality of warped pixels based on the weights,
    wherein the super-pixel mapper further configured to determine a size of the super-pixel in consideration of a distance between the first warped pixel and a second warped pixel near the first warped pixel.

2. The apparatus of claim 1,
    wherein the blending processor is configured to allocate a relatively large weight to pixels included in the dense distribution range and allocate a relatively small weight to pixels included in the sparse distribution range.

3. The apparatus of claim 2,
    wherein the blending processor is further configured to use a plurality of pixels included in the dense distribution range in the blending while excluding a pixel included in the sparse distribution range from the blending.

4. The apparatus of claim 1,
    wherein the blending processor is specifically configured to determine a first weight according to a distance between the plurality of pixels and a pixel of the at least one input viewpoint image, determine a second weight proportional to an inverse of depth values of the plurality of pixels, determine the final weight by integrating the first weight and the second weight, and blend the plurality of pixels based on the final weight.

5. The apparatus of claim 1, wherein
    the super-pixel mapper further configured to map the super-pixel to the first warped pixel of the plurality of warped pixels based on a difference between a first depth value of the first warped pixel and a second depth value of the second warped pixel near to the first warped pixel.

6. The apparatus of claim 5,
    wherein the super-pixel mapper is further configured to map the super-pixel to the first warped pixel when the difference is less than or equal to a predetermined threshold and map no super-pixel to the first warped pixel when the difference is greater than the predetermined threshold.

7. The apparatus of claim 5,
wherein the blending processor is further configured to determine a first weight according to a distance between the plurality of pixels to a pixel of the at least one input viewpoint image, determine a second weight proportional to an inverse of depth values of the plurality of pixels, determine a third weight based on a distribution of depth values of the plurality of pixels, determine a fourth weight according to a size of the super-pixel, determine a final weight by incorporating the first weight, the second weight, the third weight, and the fourth weight, and blend the plurality of pixels and/or the super-pixel based on the final weight.

8. The apparatus of claim 1,
wherein the blending processor is configured to determine a pixel having a smallest depth value among a plurality of first pixels as a representative pixel of a first input viewpoint image of at least one input viewpoint image when the plurality of first pixels are warped from the first input viewpoint image to a first location of the virtual viewpoint image coordinate system.

9. The apparatus of claim 1,
wherein the blending processor is further configured to allocate a relatively small weight to a super-pixel having a relatively large size and allocate a relatively large weight to a super-pixel having a relatively small size.

10. The apparatus of claim 1,
wherein the blending processor is specifically configured to determine a first weight according to a distance between the plurality of pixels and a pixel of the at least one input viewpoint image, determine a second weight proportional to an inverse of depth values of the plurality of pixels, determine a third weight based on a distribution of depth values of the plurality of pixels, determine a final weight by integrating the first weight, the second weight, and the third weight, and blend the plurality of pixels based on the final weight.

* * * * *